(12) United States Patent
Kukino et al.

(10) Patent No.: US 6,265,337 B1
(45) Date of Patent: Jul. 24, 2001

(54) HIGH STRENGTH SINTERED BODY

(75) Inventors: Satoru Kukino; Tomohiro Fukaya; Junichi Shiraishi; Tetsuo Nakai, all of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/453,391

(22) Filed: Dec. 3, 1999

(30) Foreign Application Priority Data

Dec. 4, 1998 (JP) .................................................. 10-346211

(51) Int. Cl.⁷ ................................................ C04B 35/5831
(52) U.S. Cl. .......................................... 501/96.4; 501/96.1
(58) Field of Search ................................. 501/96.1, 96.3, 501/96.4

(56) References Cited

U.S. PATENT DOCUMENTS

| | | | | |
|---|---|---|---|---|
| 5,466,642 | * | 11/1995 | Tajima et al. ........................ | 501/96.4 |
| 5,948,716 | * | 9/1999 | Kume et al. ......................... | 501/96.4 |
| 6,001,757 | * | 12/1999 | fukaya et al. ....................... | 501/96.4 |
| 6,001,758 | * | 12/1999 | Fukaya et al. ...................... | 501/96.4 |
| 6,008,153 | * | 12/1999 | Kukino et al. ...................... | 501/96.4 |
| 6,140,262 | * | 10/2000 | Collier et al. ...................... | 501/96.4 |

FOREIGN PATENT DOCUMENTS

| | | | | |
|---|---|---|---|---|
| 0 879 806 A1 | * | 11/1998 | (EP) . | |
| 2 320 725 | * | 7/1998 | (GB) . | |

* cited by examiner

*Primary Examiner*—Karl Group
(74) *Attorney, Agent, or Firm*—McDermott, Will & Emery

(57) ABSTRACT

A sintered body contains a high pressure form boron nitride in the range of 20 to 70% by volume, a first binding material surrounding the high pressure form boron nitride with a thickness in the range of 5 nm to 300 nm and a second binding material of the balance. The first binding material is composed of at least one of nitride and boride of Ti and Al. The second binding material is composed of at least one selected from the group consisting of nitride, carbide, carbonitride, boride and oxide of Al and transition metals belonging to the group 4a, 5a and 6a in the periodic table and mutual solid solution thereof. Supposing that X is the amount of Al contained per unit volume in the first binding material and Y is the amount of Al contained per unit volume in the second binding material, the ratio X/Y is not less than 1.

4 Claims, No Drawings

HIGH STRENGTH SINTERED BODY

BACKGROUND OF THE INVENTION

1. Field of the Invention

The present invention relates to a high strength sintered body using a high pressure form boron nitride incorporated therein.

2. Description of the Related Art cBN is the hardest material next to diamond. cBN-based sintered bodies are used in various cutting tools, abrasion-resistant parts etc.

This kind of sintered body can hardly exhibit a high hardness and a high strength at the same time. Techniques for satisfying the two requirements at the same time are described in, e.g., JP-B-62-25630 (The term "JP-B" as used herein means an "examined Japanese patent application"), JP-B-62-25631 and JP-A-5-186272 (The term "JP-A" as used herein means an "unexamined published Japanese patent application").

However, the foregoing various techniques are not necessarily sufficient with respect to the simultaneous accomplishment of the two requirements. In particular, these techniques leave something to be desired in strength under severe cutting conditions as in interrupted cutting of hard to cut materials.

SUMMARY OF THE INVENTION

It is an object of the present invention to provide a sintered body which exhibits a high hardness and a high strength at the same time and thus has an assured long life.

A sintered body contains a high pressure form boron nitride in the range of 20 to 70% by volume, a first binding material surrounding the high pressure form boron nitride with a thickness in the range of 5 nm to 300 nm and a second binding material of the balance. The first binding material is composed of at least one of nitride and boride of Ti and Al. The second binding material is composed of at least one selected from the group consisting of nitride, carbide, carbonitride, boride and oxide of Al and transition metals belonging to the group 4a, 5a and 6a in the periodic table and mutual solid solution thereof. Supposing that X is the amount of Al contained per unit volume in the first binding material and Y is the amount of Al contained per unit volume in the second binding material, the ratio X/Y is not less than 1.

DETAILED DESCRIPTION OF THE INVENTION

The present invention will be described as follows in detail.

A sintered body according to the present invention contains 20 to 70% by volume of a high pressure form boron nitride, a first binding material surrounding the high pressure form boron nitride with a thickness of 5 nm to 300 nm and the balance of a second binding material. The first binding material is composed of at least one of nitride and boride of Ti and Al. The second binding material is composed of at least one selected from the group consisting of nitride, carbide, carbonitride, boride and oxide of Al and transition metals belonging to the group 4a, 5a and 6a in the periodic table and mutual solid solution thereof. Supposing that X is the amount of Al contained per unit volume in the first binding material and Y is the amount of Al contained per unit volume in the second binding material, the ratio X/Y is not less than 1.

Examples of the high pressure form boron nitride employable herein include cubic boron nitride (cBN) and wurtzite boron nitride (wBN).

The nitride of Ti and Al to be contained in the first binding material are preferably in the form of cubic structure.

In a region containing at least 100 high pressure form boron nitride particles, the proportion of the number of the high pressure form boron nitride particles in contact with other high pressure form boron nitride particles is preferably from not less than 0.1% to less than 20.0%.

Further, when the sintered body according to the present invention is subjected to the following dissolution treatment, the residual high pressure form boron nitride particles are present in the form of single particle in a proportion of at least 90% thereof.

Specimen: Rectangular parallelepiped sintered body having a side of 3 mm to 7 mm and a thickness of from not less than 0.3 mm to not more than 0.5 mm Solution: Fluoronitric acid comprising 40 ml of diluted nitric acid obtained by diluting nitric acid having a concentration of 60.0% to 65.0% by weight twice and 10 ml of hydrofluoric acid having a concentration of 45.0% to 50.0% by weight in admixture- Temperature: From 120° C. to 150° C.

Time: From 3 hours to 5 hours

Such a sintered body has heretofore been hardly produced. In the present invention, the foregoing sintered body is obtained by a process including coating high pressure form boron nitride particles with a nitride or boride of Ti and Al by PVD process (physical vapor deposition), mixing the coated particles to a binding material made of a nitride, carbide or boride of Al or a transition metal belonging to the group 4a, 5a or 6a in the periodic table, and then sintering the material at an ultrahigh pressure and temperature. The sintering pressure and temperature may be from 3 to 5 Gpa and from 1,000 to 1,500° C., respectively. As the means for coating the first binding material there may be used a chemical vaporization process (CVD process) besides PVD process.

In order to enhance the strength of the sintered body, it is effective to enhance the strength of bond between the high pressure form boron nitride and the binding material. If a nitride or boride of Ti and Al is present as a first material around the high pressure form boron nitride particles, the interface with the high pressure form boron nitride exhibits an enhanced reactivity that increases the bond strength and hence the strength of the sintered body. In particular, an Al compound has a high reactivity. It is preferred that the first binding material have a higher Al concentration than the second binding material. If the Al concentration of the second binding material is higher than that of the first binding material, the resulting sintered body exhibits a deteriorated abrasion resistance.

Further, if the first binding material is made of cubic TiAlN, it exhibits a higher hardness and strength than that made of a hexagonal nitride of Ti and Al. Further, cubic boron nitride (cBN) is preferable as the high pressure form boron nitride. It's average particle diameter is preferably in the range of 0.1 to 10 $\mu$m.

The reason why the main conditions are predetermined as mentioned above will be described hereinafter.

<Content of High Pressure Form Boron Nitride>

If the content of high pressure form boron nitride falls below 20% by volume, the resulting sintered body of high pressure form boron nitride doesn't exhibit its inherent properties. On the contrary, if the content of high pressure form boron nitride exceeds 70% by volume, the amount of the binding material is decreased, causing a drop of strength.

<Thickness of First Binding Material>

If the thickness of the first binding material falls below 5 nm, the desired effect cannot be exerted. On the contrary, if the thickness of the first binding material exceeds 300 nm, the content of Al in the sintered body is increased, causing a rise in abrasion resistance.

<Contact Ratio of High Pressure Form Boron Nitride>

If the contact ratio of high pressure form boron nitride exceeds 20%, the resulting contact points become defects causing a drop of strength.

<State of High Pressure Form Boron Nitride Particles Which Have been Acid-Treated>

If the ratio of single particles falls below 90%, it means that many high pressure form boron nitride particles come in contact with each other to generate many defects causing a drop of strength.

EXAMPLES

The present invention will be specifically explained in the following examples. However, the present invention is not limited thereto.

Example 1

A particulate cBN in 50% by volume having a particle diamter of 3 $\mu$m, coated with cubic TiAlN and each of binding materials described in Table 1 were mixed. The mixture was then sintered at a temperature of 1,150° C. and a pressure of 4.5 Gpa. The compond of the sinterd body was analyzed by XRD (X-Ray-Diffraction). The amount X of Al contained per unit volume in the first binding material and the amount Y of Al contained per unit volume in the second binding material were analyzed by Auger Electron Spectroscopy. Thus, a sintered tip having a shape defined in SNGN120408 (ISO standard) was obtained. The tip thus obtained was then subjected to cutting test to determine the life of the sintered body. For comparison, a particulate cBN coated with TiN and AlN was subjected to the same cutting test. The cutting test conditions will be described below. The results are set forth in Table 1 below.

Material to be cut: SKD11 (HRC60) (with six V-grooves)

Cutting conditions (dry): Cutting speed (V): 120 m/min; feed (f): 0.1 mm/rev; depth of cut (d): 0.2 mm

TABLE 1

| | Binding material (starting material) | First binding material and thickness | Second binding material | X/Y | Life (min) |
|---|---|---|---|---|---|
| 1 | TiN, Ti$_2$AlN, TiAl$_3$ | Cubic TiAlN 60 nm | TiN, TiB$_2$, AlB$_2$, AlN | 2.2 | 40 |
| 2 | TiC, Al$_3$ | Cubic TiAlN 150 nm | TiC, TiB$_2$, AlB$_2$, AlN, Al$_2$O$_3$ | 3.2 | 38 |
| 3 | HfN, Hf and intermetallic compound of Al | Cubic TiAlN 250 nm | HfN, HfB$_2$, AlB$_2$, AlN, Al$_2$O$_3$ | 1.5 | 35 |
| 4 | Zrn, Zr and intermetallic compound of Al | Cubic TiAlN 120 nm | ZrN, ZrB$_2$, AlB$_2$ | 2.8 | 36 |
| 5 | TiN, Ti$_2$AlN, TiAl$_3$ | TiN + AlN 100 nm | TiN, TiB$_2$, AlB$_2$, AlN | 2.4 | 3 |

As can be seen in Table 1, the sintered body employing cubic TiAlN as a first binding material exhibits a far longer tool life than that free of cubic TiAlN.

Example 2

A particulate cBN in 48% by volume having the average particle diamter of 5 $\mu$m coated with cubic TiAlN and a binding material made of TiN, Ti$_2$AlN and TiAl$_3$ were sintered at an ultrahigh pressure to obtain each sintered body set forth in Table 2. The first binding material is cubic TiAlN having the thickness of 60 nm and the second binding material was composed of TiN, TiB$_2$, AlB$_2$, AlN and Al$_2$O$_3$. The shape of the sintered body was the same as that of Example 1. Subsequently, using Auger Electron Spectroscopy, the Al concentration of the first material and the second material in the sintered body were compared with each other. Then, the ratio X/Y was determined supposing that X is the amount of Al contained per unit volume in the first binding material and Y is the amount of Al contained per unit volume in the second binding material. The sintered body thus obtained was subjected to cutting test as a tip to determine the life thereof. The cutting test conditions will be described below. The results are set forth in Table 2 below.

Material to be cut: SKD11 (HRC60) (with four U-grooves)

Cutting conditions (dry): Cutting speed (V): 120 m/min; feed (f): 0.1 mm/rev; depth of cut (d): 0.2 mm

TABLE 2

| Concentration ratio X/Y | Life (min) |
|---|---|
| 0.9 | 2 |
| 1.1 | 34 |
| 2.3 | 34 |
| 3.9 | 32 |
| 4.9 | 36 |

As can be seen in Table 2, when the concentration ratio X/Y is not less than 1, a cutting tool having a long life can be obtained.

Example 3

A particulate cBN having an average particle diamter of 3.3 $\mu$m coated with cubic TiAlN and binding material made of TiN, Ti$_2$AlN, and TiAl$_3$ were mixed with each other in a proportion such that the cBN content set forth in Table 3 was reached, respectively. The mixture was sintered to obtain a sintered body. The shape of the sintered body was the same as in Example 1. The first binding material was cubic and has a thickness of 60 nm. The second binding material was made of TiN, TiB$_2$, AlB$_2$, AlN, and Al$_2$O$_3$. The value of X/Y was within the range of 2.3 to 2.6. The sintered body thus obtained was subjected to cutting test as a tip to determine the life thereof. The cutting test conditions will be described below. The results are set forth in Table 3 below.

Material to be cut: SCM415 (HRC60) (with six U-grooves)

Cutting conditions (dry): Cutting speed (V): 120 m/min; feed (f): 0.1 mm/rev; depth of cut (d): 0.2 mm

TABLE 3

| CBN content (vol. %) | Life (min) |
|---|---|
| 18 | 3 |
| 21 | 23 |
| 30 | 24 |
| 50 | 25 |
| 60 | 27 |
| 69 | 23 |
| 85 | 2 |

As can be seen in Table 3, when the cBN content is from 20 to 70% by volume, a cutting tool having a long life can be obtained.

Example 4

Particulate cBN having a cBN content of 60% by volume and an average particle diameter of 2 μm coated with cubic TiAlN or TiN+AlN set forth in Table 4 and a binding material material made of TiN, TiAl, TiAl$_3$, Ti$_2$AlN, AlN and AlB$_2$ were mixed with each other, respectively. The mixture thus obtained was sintered under the conditions set forth in Table 4. In Table 4, the term "coat" indicates the material around unsintered cBN, and the term "first binding material" indicates the material around sintered cBN. In this manner, a sintered body composed of each of first binding materials having a thickness of 100 nm set forth in Table 4 and second binding material made of TiN, TiB$_2$, AlN, AlB$_2$ and Al$_2$O$_3$ were obtained. The shape of the sintered body was the same as in Example 1. For comparison, a sintered body having the same composition as above was prepared from particulate cBN coated with TiN and AlN were prepared. The sintered body thus obtained was then each subjected to cutting test as a tip to determine the life thereof. The cutting test conditions will be described below. The results are set forth in Table 4. The value of X/Y is in the range of 2.3 to 2.7.

Material to be cut: SKD 11(HRC 60) (with eight U-grooves)

Cutting conditions (dry): Cutting speed (V): 120 m/min; feed (f): 0.1 mm/rev; depth of cut (d): 0.2 mm

TABLE 4

| Coat | Sintering conditions Temperature(° C.)/pressure (Gpa) | First binding material | Life (min) |
| --- | --- | --- | --- |
| Cubic TiAlN | 1,100/4.3 | cubic TiAlN | 42 |
| Cubic TiAlN | 1,300/5 | TiN + AlN | 32 |
| TiN + AlN | 1,100/4.3 | TiN + AlN | 12 |
| TiN + AlN | 1,300/5 | TiN + AlN | 11 |

As a result, it can be seen that the material coated with cubic TiAlN or sintered at a low temperature and pressure can form a sintered body having a long life. In particular, the material which can maintain cubic TiAlN even after sintering exhibits a long life.

Example 5

Each Sintered body having an average particle diameter of 4 μm, a thickness of 80 nm and cBN contents set forth in Table 5 composed of cubic TiAlN as a first binding material and ZrN, TiN, AlB$_2$, AlN and Al$_2$O$_3$ as a second binding material was examined for contact ratio of cBN particles. For the measurement of contact ratio, a section of the sintered body was observed under microscope. In a region containing at least 100 cBN particles, the number of the cBN particles in contact with other cBN particles was determined. The value of X/Y is 1.8.

Further, these sintered bodies were each acid-treated under the conditions described below. The particle size distribution of the residual high pressure form boron nitride particles in the form of single particle was then determined.

Specimen: Rectangular parallelepiped sintered body having a side of 5 mm and a thickness of 0.4 mm Solution: Fluoronitric acid comprising 40 ml of diluted nitric acid obtained by diluting nitric acid having a concentration of 62.0% by weight twice and 10 ml of hydrofluoric acid having a concentration of 47.0% by weight in admixture Temperature: 130° C.

Time: 4 hours

Further, the sintered bodies thus obtained (having the same shape as in Example 1) were then each subjected to cutting test as a tip to determine the life thereof. The cutting test conditions will be described below. For comparison, the sintered bodies obtained by the conventional method were subjected to the same cutting test as above. The results are set forth in Table 5.

Material to be cut: SKD415 (HRC60) (with eight V-grooves)

Cutting conditions (dry): Cutting speed (V): 120 m/min; feed (f): 0.1 mm/rev; depth of cut (d): 0.2 mm

TABLE 5

| cBN content (vol-%) | Contact ratio (%) | Life (min) | Existence of single particles after acid treatment (%) |
| --- | --- | --- | --- |
| 18 | 0.07 | 3 | 88 |
| 25 | 1 | 34 | 99 |
| 45 | 5 | 25 | 96 |
| 50 | 10 | 34 | 92 |
| 60 | 15 | 29 | 91 |
| 69 | 19 | 28 | 94 |
| 85 | 25 | 4 | 3 |
| 60 | 36 | 3 | 70 |

As can be seen in Table 5, when the contact ratio is from 0% to 20% and the percent existence of single particles after acid treatment is not less than 90%, the resulting tool has a long life.

Each of a sintered body composed of a first binding material cubic TiAlN having thickness set forth in Table 6 and a second binding material made of HfC, TiN, TiB$_2$ and AlN (having shape as in Example 1), in which the amount of cBN is 65% volume and an average particle diameter of cBN is 1.2 μm, was prepared. Thus prepared sintered body was subjected to cutting test to determine the life thereof. The cutting test conditions will be described below. The results of the cutting test are set forth in Table 6 below. The value of X/Y is 3.5.

Material to be cut: SKD (HRC60) (with two U-grooves)

Cutting conditions (dry): Cutting speed (V): 120 m/min; feed (f): 0.1 mm/rev; depth of cut (d): 0.2 mm

TABLE 6

| Thickness (nm) | Life (min) |
| --- | --- |
| 4 | 3 |
| 6 | 36 |
| 50 | 42 |
| 100 | 38 |
| 200 | 39 |
| 290 | 37 |
| 350 | 10 |
| 400 | 9 |

As can be seen in Table 6, when the thickness of the first binding material is from 5 nm to 300 nm, the resulting cutting tool has a long life.

As mentioned above, the present invention can provide a sintered body which exhibits a high hardness and a high toughness at the same time. Accordingly, cutting tools, abrasion-resistant parts, impact-resistant parts, etc. made of the sintered body according to the present invention can be assured a long life even under severe working conditions.

What is claimed is:

1. A high strength sintered body comprising:

a high pressure form boron nitride in the range of 20 to 70% by volume;

a first binding material surrounding the high pressure form boron nitride with a thickness in the range of 5 nm to 300 nm, the first binding material comprising at least one of nitride and boride of Ti and Al; and a second binding material of the balance comprising at least one selected from the group consisting of nitride, carbide, carbonitride, boride and oxide of Al and transition metals belonging to the group 4a, 5a and 6a in the periodic table and mutual solid solution thereof;

wherein the ratio X/Y is not less than 1 supposing that X is the amount of Al contained per unit volume in the first binding material and Y is the amount of Al contained per unit volume in the second binding material.

2. The high strength sintered body according to claim 1, wherein the nitride of Ti and Al contained in the first binding material have a cubic structure.

3. The high strength sintered body according to claim 1, wherein the proportion of the number of high pressure form boron nitride particles in contact with other high pressure form boron nitride particles in a region containing at least 100 high pressure form boron nitride particles is in the range of 0.1% to 20.0%.

4. The high strength sintered body according to claim 1, which has high pressure form boron nitride particles left present in the form of single particle in a proportion of at least 90% thereof when subjected in the form of rectangular parallelepiped having a side of 3 mm to 7 mm and a thickness of 0.3 mm to 0.5 mm to dissolution with fluoronitric acid comprising 40 ml of diluted nitric acid obtained by diluting nitric acid having a concentration of from 60.0% to 65.0% by weight twice and 10 ml of hydrofluoric acid having a concentration of from 45.0% to 50.0% by weight in admixture at a temperature of 120° C. to 150° C. for 3 to 5 hours in a sealed vessel.

\* \* \* \* \*